United States Patent
Hudiono et al.

(10) Patent No.: US 7,924,521 B1
(45) Date of Patent: Apr. 12, 2011

(54) DATA WEDGE FORMAT TABLE SYNCHRONIZATION

(75) Inventors: Lim Hudiono, Laguna Niguel, CA (US); Daniel R. Pinvidic, San Juan Capistrano, CA (US); Stanley K. Cheong, Lake Forest, CA (US)

(73) Assignee: Marvell International Ltd., Hamilton (BM)

( * ) Notice: Subject to any disclaimer, the term of this patent is extended or adjusted under 35 U.S.C. 154(b) by 823 days.

(21) Appl. No.: 11/879,614

(22) Filed: Jul. 18, 2007

Related U.S. Application Data

(60) Provisional application No. 60/910,937, filed on Apr. 10, 2007.

(51) Int. Cl.
*G11B 5/09* (2006.01)

(52) U.S. Cl. ........... 360/51; 360/48; 360/53; 360/77.02; 360/78.04

(58) Field of Classification Search .................. None
See application file for complete search history.

(56) References Cited

U.S. PATENT DOCUMENTS

| | | | | |
|---|---|---|---|---|
| 5,278,703 | A * | 1/1994 | Rub et al. .................. | 360/51 |
| 5,650,882 | A * | 7/1997 | Tsurumi et al. ............. | 360/51 |
| 6,038,619 | A * | 3/2000 | Berning et al. ............. | 710/33 |
| 6,154,331 | A * | 11/2000 | Hanna ........................ | 360/51 |
| 6,195,217 | B1 * | 2/2001 | Park ........................... | 360/48 |
| 6,219,729 | B1 * | 4/2001 | Keats et al. ................. | 710/58 |
| 6,295,176 | B1 * | 9/2001 | Reddy et al. ............... | 360/48 |
| 6,862,151 | B2 * | 3/2005 | Hoskins et al. ............. | 360/53 |
| 7,287,102 | B1 * | 10/2007 | White et al. ................ | 710/34 |
| 7,609,468 | B2 * | 10/2009 | Pinvidic et al. ............. | 360/51 |

* cited by examiner

*Primary Examiner* — Dismery E Mercedes

(57) ABSTRACT

A control module for a rotating storage medium includes a data wedge format table (DWFT). The control module also includes a buffer control module that has a DWFT queue that includes X entries from the DWFT and one of X first servo information for each of the X entries. X is a positive integer. A disk formatter module that compares the one of X first servo information with second servo information that is based on a current position of a read/write device in relation to the rotating storage medium.

59 Claims, 9 Drawing Sheets

| CRC | Reserve | First Sector ID | First Sector Delay | Words to Split | First Sector Delay |

| CRC Good Status | Servo Number | CRC | Reserve | First Sector ID | First Sector Delay | Words to Split | First Sector Delay |

DATA WEDGE FORMAT TABLE SYNCHRONIZATION

CROSS-REFERENCE TO RELATED APPLICATIONS

This application claims the benefit of U.S. Provisional Application No. 60/910,937, filed Apr. 10, 2007. The disclosure of the above application is incorporated herein by reference in its entirety.

FIELD

The present disclosure relates to rotating storage devices, and more particularly to read/write channel data paths and synchronization of data therein.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The speed at which a rotating data storage device, such as a magnetic or an optical storage device, executes read and write operations affects the performance of a computer or other host device. A rotating data storage device may be, for example, a hard disk drive (HDD), a compact disc (CD) drive, a digital versatile disc (DVD) drive or a high definition/high data storage disc drive. Operational delay in the rotating data storage device can cause a corresponding delay in operation of the host device.

Typically, a HDD includes a read/write channel with a disk formatter that performs a read or a write operation on one or more magnetic disks. Each disk includes tracks that store data. The tracks are divided into wedges or sectors. Servo numbers may identify servo areas between sectors. A read/write head or read/write device is used to read from or write to the sectors. In use, the HDD receives a command signal that identifies a target sector or a block of target sectors for a read/write operation.

Current read/write operations have associated delays. As an example, in performing a write operation for a predetermined number of target sectors, a command signal for data to be written is generated. Based on the command signal, the read/write channel receives the data in one sector increments. The sectors are handled one at a time and in a sequential format. Each sector is stored in memory associated with the read/write channel and provided to the disk formatter. Upon error correction coding and data formatting of a current sector, the read/write channel receives a next or subsequent sector. Speed of the read/write channel is limited based on such data transfer.

SUMMARY

A control module for a rotating storage medium includes a data wedge format table (DWFT). The control module also includes a buffer control module that has a DWFT queue that includes X entries from the DWFT and one of X first servo information for each of the X entries. X is a positive integer. A disk formatter module that compares the one of X first servo information with second servo information that is based on a current position of a read/write device in relation to the rotating storage medium.

In other features, the first servo information includes sequential servo numbers. One of the servo numbers corresponds to the current position. The disk formatter module selects one of the X entries having the one of the servo numbers. A buffer memory stores the DWFT. The buffer control module fills multiple entries in the DWFT queue during a single access to the buffer memory. The buffer control module further includes a fill status module that determines whether the DWFT queue is full. The buffer control module further includes a request module that requests entries from the DWFT based on signals from the fill status module.

In other features, the buffer control module includes a DWFT control module that includes the DWFT queue. The DWFT control module also includes an index counter and an index counter controller that increments the index counter and associates the first servo information for each of the X entries. The DWFT control module further includes a cyclical redundancy check (CRC) status module that checks the X entries with the DWFT. The disk formatter module includes a servo counter module that includes the second servo information. The second servo information includes servo numbers. The disk formatter module checks entries of the DWFT queue prior to comparing the first and second servo information.

In other features, a disk formatter module includes a servo counter module that counts first servo information that is based on a current position of a read/write head over the rotating storage medium. A DWFT synchronization module compares the first servo information with second servo information from a data wedge format table (DWFT) queue. The DWFT queue includes X entries from a DWFT. X is a positive integer. One of the X entries is used for at least one of read and write operations to the rotating storage medium based on the comparison. The first servo information includes sequential servo numbers, where one of the servo numbers corresponds to the current position. A sector pulse tracker of the disk formatter determines a start of a sector pulse for the rotating storage medium.

In other features, the disk formatter module comprises a stop operation/interrupt module that halts an operation of the disk formatter module. The stop operation/interrupt module also generates an interrupt based on a mismatch between one of the X entries and the current position following the comparison. A hard disk drive system includes the disk formatter module and buffer memory that includes the DWFT. The hard disk drive system also includes a buffer control module that includes the DWFT queue and that controls the buffer memory.

In other features, buffer control module further includes a fill status module that determines a number of entries in the DWFT queue. The buffer control module further includes a request module that requests entries from the DWFT based on fill status module signals. The buffer control module further includes a DWFT control module that includes the DWFT queue and an index counter. An index counter controller increments the index counter for each DWFT entry in the DWFT queue. The DWFT control module further includes a cyclical redundancy check (CRC) status module that checks the X entries with the DWFT. The DWFT synchronization module checks entries of the DWFT queue prior to comparing the first and second servo information.

In other features, a method for controlling a rotating storage medium includes controlling a DWFT queue that includes X entries from a DWFT and one of X first servo information for each of the X entries. X is a positive integer. The method also includes comparing the one of X first servo information with second servo information that is based on a current position of a read/write device in relation to the rotating storage medium. The first servo information includes sequential servo numbers where one of the servo numbers corresponds to the current position. The method also includes selecting one of the X entries having the one of the servo numbers.

In other features, the method includes storing the DWFT in a buffer memory. The method also includes filling multiple entries in the DWFT queue during a single access to the buffer memory and determining whether the DWFT queue is full. The method also includes requesting entries from the DWFT based on whether the DWFT queue is full. The second servo information includes servo numbers. The method also includes checking entries of the DWFT queue prior to comparing the first and second servo information.

In other features, a method for operating a disk formatter module includes counting first servo information that is based on a current position of a read/write head over the rotating storage medium. The method also includes comparing the first servo information with second servo information from a data wedge format table (DWFT) queue that includes X entries from a DWFT. X is a positive integer. The method also includes using one of the X entries for at least one of read and write operations to the rotating storage medium based on the comparison. The first servo information includes sequential servo numbers, where one of the servo numbers corresponds to the current position.

In other features, the method includes determining a start of a sector pulse for the rotating storage medium and halting an operation of the disk formatter module. The method also includes generating an interrupt based on a mismatch between one of the X entries and the current position following the comparison. The method also includes determining a number of entries in the DWFT queue. The method also includes requesting entries from the DWFT based on the number of entries in the DWFT queue. The method also includes checking the X entries with the DWFT. The method includes checking entries of the DWFT queue prior to comparing the first and second servo information.

In other features, a control module for controlling a rotating storage medium includes a data wedge format table (DWFT). Buffer control means for controlling buffer means for storing data includes a DWFT queue. The DWFT queue includes X entries from the DWFT and one of X first servo information for each of the X entries. X is a positive integer. The control module also includes disk formatter means for comparing the one of X first servo information with second servo information that is based on a current position of a read/write device in relation to the rotating storage medium. The first servo information includes sequential servo numbers, where one of the servo numbers corresponds to the current position.

In other features, the disk formatter means selects one of the X entries having the one of the servo numbers. The buffer means stores the DWFT. The buffer control means fills multiple entries in the DWFT queue during a single access to the buffer means. The buffer control means further includes fill status means for determining whether the DWFT queue is full. The buffer control means further includes request means for requesting entries from the DWFT based on signals from the fill status means. The buffer control means further includes DWFT control means for controlling that includes the DWFT queue. The DWFT control means also includes index counter means for counting and index counter control means for incrementing the index counter means and for associating the first servo information for each of the X entries.

In other features, the DWFT control means includes cyclical redundancy check (CRC) status means for checking the X entries with the DWFT. The disk formatter means includes servo counter means for counting that includes the second servo information. The second servo information includes servo numbers. The disk formatter means checks entries of the DWFT queue prior to comparing the first and second servo information.

In other features, a disk formatter module includes servo counter means for counting first servo information that is based on a current position of a read/write head over the rotating storage medium. The disk formatter module also includes DWFT synchronization means for comparing the first servo information with second servo information from a data wedge format table (DWFT) queue. The DWFT queue includes X entries from a DWFT. One of the X entries is used for at least one of read and write operations to the rotating storage medium based on the comparison.

In other features, the first servo information includes sequential servo numbers, where one of the servo numbers corresponds to the current position. Sector pulse tracker means determine a start of a sector pulse for the rotating storage medium. The disk formatter module further includes stop operation/interrupt means for halting an operation of the disk formatter module. The stop operation/interrupt means also generates an interrupt based on a mismatch between one of the X entries and the current position following the comparison.

In other features, a hard disk drive system includes the disk formatter module, buffer means for storing the DWFT, and buffer control means for controlling the buffer. The buffer control means further includes fill status means for determining a number of entries in the DWFT queue. The buffer control means further includes request means for requesting entries from the DWFT based on fill status means signals. The buffer control means further includes DWFT control means for controlling the DWFT. The DWFT control means includes the DWFT queue, index counter means for counting, and index counter control means for incrementing the index counter means for each DWFT entry in the DWFT queue.

In other features, the DWFT control means further includes cyclical redundancy check (CRC) status means for checking the X entries with the DWFT. The DWFT synchronization means checks entries of the DWFT queue prior to comparing the first and second servo information.

In still other features, the systems and methods described above are implemented by a computer program executed by one or more processors. The computer program can reside on a computer readable medium such as but not limited to memory, non-volatile data storage and/or other suitable tangible storage mediums.

The computer program includes controlling a DWFT queue that includes X entries from a DWFT and one of X first servo information for each of the X entries. X is a positive integer. The computer program also includes comparing the one of X first servo information with second servo information that is based on a current position of a read/write device in relation to the rotating storage medium. The first servo information includes sequential servo numbers where one of the servo numbers corresponds to the current position. The computer program also includes selecting one of the X entries having the one of the servo numbers.

In other features, the computer program includes storing the DWFT in a buffer memory. The computer program also includes filling multiple entries in the DWFT queue during a single access to the buffer memory and determining whether the DWFT queue is full. The computer program also includes requesting entries from the DWFT based on whether the DWFT queue is full. The second servo information includes servo numbers. The computer program also includes checking entries of the DWFT queue prior to comparing the first and second servo information.

In other features, a computer program for operating a disk formatter module includes counting first servo information that is based on a current position of a read/write head over the rotating storage medium. The computer program also includes comparing the first servo information with second servo information from a data wedge format table (DWFT) queue that includes X entries from a DWFT. X is a positive integer. The computer program also includes using one of the X entries for at least one of read and write operations to the rotating storage medium based on the comparison. The first servo information includes sequential servo numbers, where one of the servo numbers corresponds to the current position.

In other features, the computer program includes determining a start of a sector pulse for the rotating storage medium and halting an operation of the disk formatter module. The computer program also includes generating an interrupt based on a mismatch between one of the X entries and the current position following the comparison. The computer program also includes determining a number of entries in the DWFT queue. The computer program also includes requesting entries from the DWFT based on the number of entries in the DWFT queue. The computer program also includes checking the X entries with the DWFT. The computer program includes checking entries of the DWFT queue prior to comparing the first and second servo information.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4A illustrates a buffer memory DWFT word format in accordance with an embodiment of the present disclosure;

FIG. 4B illustrates a buffer controller queue entry for a DWFT word in accordance with an embodiment of the present disclosure;

DETAILED DESCRIPTION

Figure 1:
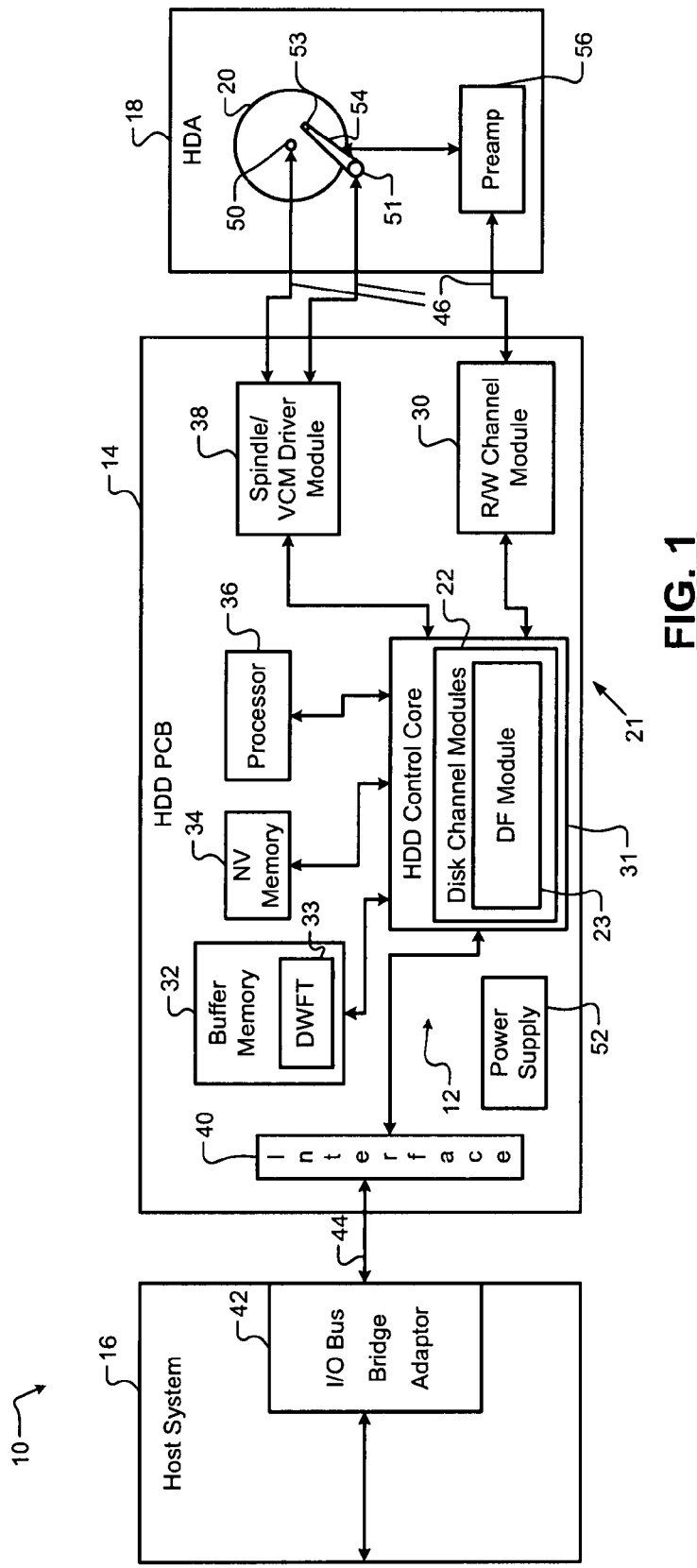
FIG. 1 is a functional block diagram of a hard disk drive system incorporating a hard disk drive control module in accordance with an embodiment of the present disclosure.

The following description is merely exemplary in nature and is in no way intended to limit the disclosure, its application, or uses. For purposes of clarity, the same reference numbers will be used in the drawings to identify similar elements. As used herein, the terms module and state machine refer to Application Specific Integrated Circuits (ASICs), electronic circuits, processors (shared, dedicated, or grouped) and memories that execute one or more software or firmware programs, combinational logic circuits, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

The present disclosure relates to synchronizing servo number counting in a disk formatter (DF) with servo number counting for a data wedge format table (DWFT) in buffer memory. The DF may include a servo counter module that maintains a current servo number count based on extracted servo numbers from a hard disk drive (HDD) control module. Previous disk formatters received servo numbers that were not current because of various processing steps that were required to deliver the servo numbers. Therefore, previous disk formatters or other HDD modules compensated those servo numbers for processing latencies. In contrast the current servo numbers do not need to be compensated for latencies.

In the present disclosure, the HDD control module may determine/extract a servo number that indicates a real-time or current position of the read/write head on a track. This may be prior to read/write operations. A DWFT may include wedge format information, such as a track map, and may be generated by the HDD control module. The track map may include a map of servos and sectors on a track. X entries from the DWFT are queued in a DWFT control module of a buffer control module where they are associated with X servo numbers. The DF receives at least some of the X entries.

The DF compares a current servo number in the servo counter module to a servo number for one of the DWFT entries. If the servo numbers match, the DWFT is in synch with the servo. Otherwise, the DF may use a DWFT entry that corresponds to the correct servo number for disk formatting or read/write operations. The servo numbers may be out of synch because the extracted servo number may be determined as the read/write head is transitioning to a new sector, while the servo number for the DWFT entry may correspond to the previous sector.

Referring now to FIG. 1, a functional block diagram of a hard disk drive (HDD) system 10 incorporating a HDD control module 12 is shown. The HDD system 10 includes a HDD printed circuit board (PCB) 14 that is coupled to a host system 16 and a hard disk assembly (HDA) 18. The HDD PCB 14 reads from and writes to sectors of a rotating storage medium 20 of the HDA 18 via the HDD control module 12. The HDD includes a read/write channel (DC) 21 through which it performs read/write tasks via read/write channel modules 22 such as the DF module 23.

The HDD PCB 14 also includes a read/write channel module 30, a buffer memory 32 that may include a DWFT 33, a nonvolatile memory 34, a processor 36, and a spindle/voice-coil motor (VCM) driver module 38. The read/write channel module 30 processes data received from and transmitted to the HDA 18. The HDD control module 12 includes a HDD control core 31 that controls components of the HDA 18 and communicates with an external device, such as the host system 16 via an I/O interface 40. The I/O interface 40 is in communication with an I/O bus bridge adaptor 42 of the host system 16 via an advanced technology attachment (ATA) bus 44. The host system 16 may include a computer, a multimedia device, a mobile computing device, etc. The I/O interface 40 may include wireline and/or wireless communication links.

The HDD control module 12 may receive data from the HDA 18, the read/write channel module 30, the buffer memory 32, the nonvolatile memory 34, the processor 36, the spindle/VCM driver module 38, and/or the I/O interface 40. The read/write channel module 30 and the spindle/VCM driver module 38 are in communication with the HDA 18 via HDA communication lines 46. The processor 36 may process the data, including encoding, decoding, filtering, and/or formatting. The processed data may be output to the HDA 18, the read/write channel module 30, the buffer memory 32, the nonvolatile memory 34, the processor 36, the spindle/VCM driver module 38, and/or the I/O interface 40.

The HDD control module 12 may use the buffer memory 32 and/or the nonvolatile memory 34 to store data related to the control and operation of the HDD 10. The buffer memory 32 may include dynamic random access memory (DRAM), synchronous DRAM (SDRAM), and/or other memory types. The buffer memory 32 may store the DWFT 33.

The nonvolatile memory 34 may include flash memory (including NAND and NOR flash memory), phase change memory, magnetic RAM, and/or multi-state memory, in which each memory cell has more than two states. The spindle/VCM driver module 38 controls a spindle motor 50 and a VCM 51. The HDD PCB 14 also includes a power supply 52 that provides power to the components of the HDD 10.

The HDA 18 includes the rotating storage medium 20. The HDA 18 further includes a read/write device, such a read/write head 53. The read/write device may be arranged on an actuator arm 54, as shown, and read and write data on the rotating storage medium 20. Additionally, the HDA 18 includes the spindle motor 50 that rotates the rotating storage medium 20 and the VCM 51 that actuates the actuator arm 54. A preamplifier device 56 amplifies signals generated by the read/write device during read operations and provides signals to the read/write device during write operations.

Figure 2:
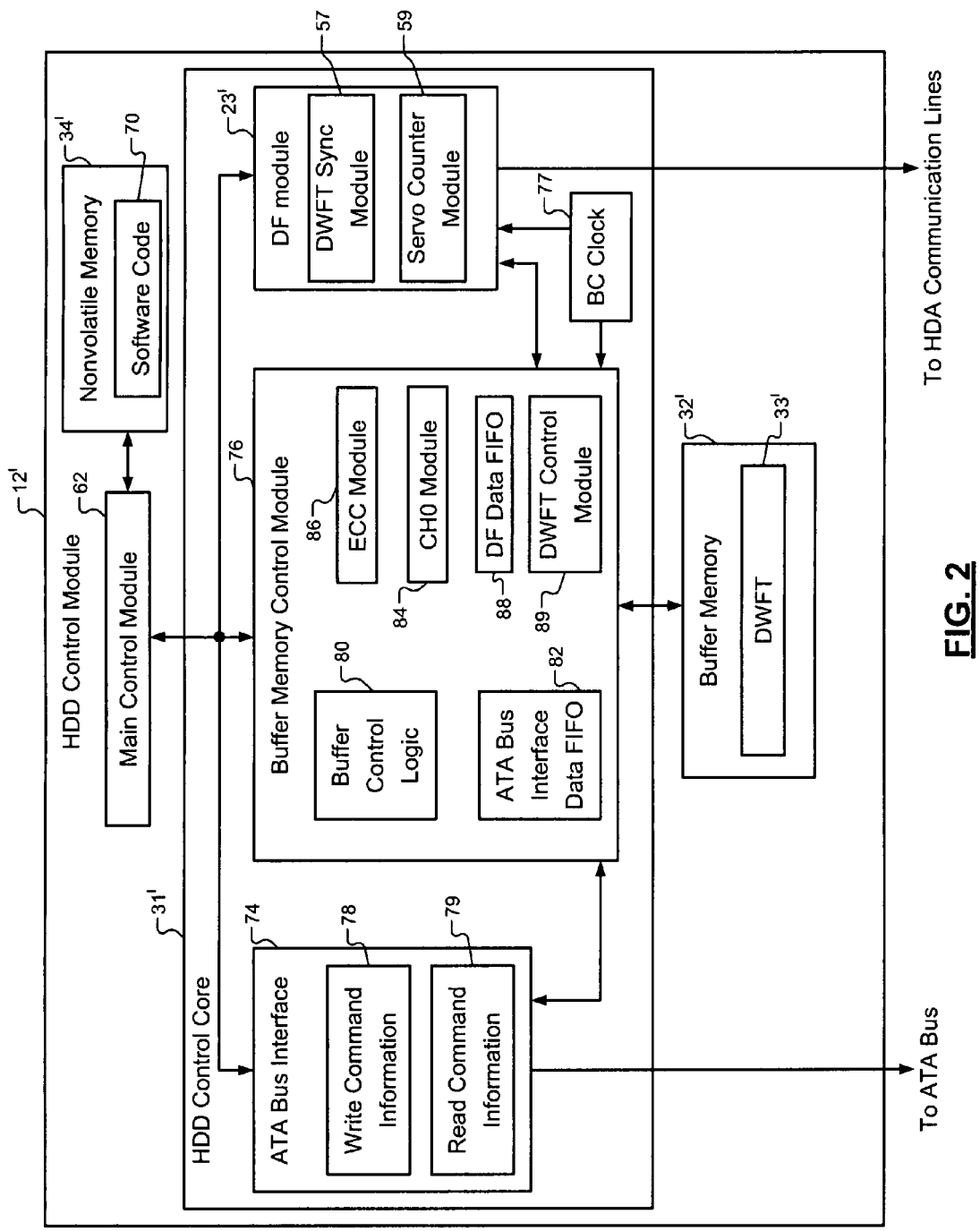
FIG. 2 is a functional block diagram of a hard disk drive control module incorporating a disk formatter in accordance with an embodiment of the present disclosure.

Referring now to FIG. 2, a functional block diagram of a HDD control module $12^I$ incorporating the DF module $23^I$ is shown. The DF module $23^I$ may include a DWFT synchronization module 57 that may synchronize an extracted servo number with a servo number in a DWFT entry. The extracted servo number may be stored in a servo counter module 59.

The HDD control module $12^I$ includes a main control module 62, a buffer memory $32^I$, a nonvolatile memory $34^I$ and a HDD control core $31^I$. The HDD control core $31^I$ handles data flow between a host bus and HDA communication lines. The host bus may be the ATA bus 44 or other host bus, such as a small computer standard interface (SCSI) or fibre channel port. The HDD control module $12^I$ transfers data between a rotating storage medium and the buffer memory $32^I$, transfers data between the buffer memory $32^I$ and an ATA bus, and performs error correction and cyclical redundancy check (CRC) calculations.

The HDD control core $31^I$ is controlled by the main control module 62, which executes software/firmware code 70 in the nonvolatile memory $34^I$. In addition to reading from and writing to a rotating storage medium, the main control module 62 handles tasks, such as moving a read/write head to a proper track and/or sector position.

The buffer memory $32^I$ may buffer data between the rotating storage medium 20 and the ATA bus 44. This compensates for delays, latency, and timing differences between the rotating storage medium and the ATA bus. The HDD control core $31^I$ also includes an ATA bus interface 74. As mentioned, the buffer memory $32^I$ may include a DWFT $33^I$. The buffer memory $32^I$ may also include DRAM. In some configurations, the buffer memory $32^I$ serves as the memory for the main control module 62. The DF module $23^I$ receives data from the buffer memory $32^I$ through a buffer control module 76, formats the data, and sends the data to the read/write head 53.

The HDD control core $31^I$ also includes a buffer controller clock 77 that provides a clock signal to the DF module $23^I$ and the buffer control module 76. The buffer controller clock 77 may also provide the clock signal to the ATA bus interface 74. The ATA bus interface 74 implements ATA bus protocols to receive write command signals and read command signals having write command information 78 and read command information 79, respectively. The ATA bus interface 74 passes the write command information 78 and the read command information 79 to the buffer memory $32^I$ through the buffer control module 76. The ATA bus interface 74 also has protocols for transmission of read data from a rotating storage medium to a host system.

The buffer control module 76 may control interleaved access to the buffer memory $32^I$ by the DF module $23^I$, the ATA bus interface 74, and the main control module 62. The buffer control module 76 may also arbitrate access of buffered data between the buffer memory $32^I$ and the DF module $23^I$, the ATA bus interface 74, and the main control module 62. The buffer control module 76 includes buffer control logic 80, an ATA bus interface data first-in-first-out (FIFO) buffer 82, a channel (CH)0 module 84, an error correction code (ECC) module 86, one or more read/write channel or DF data FIFOs 88, and a DWFT control module 89.

Figure 3:
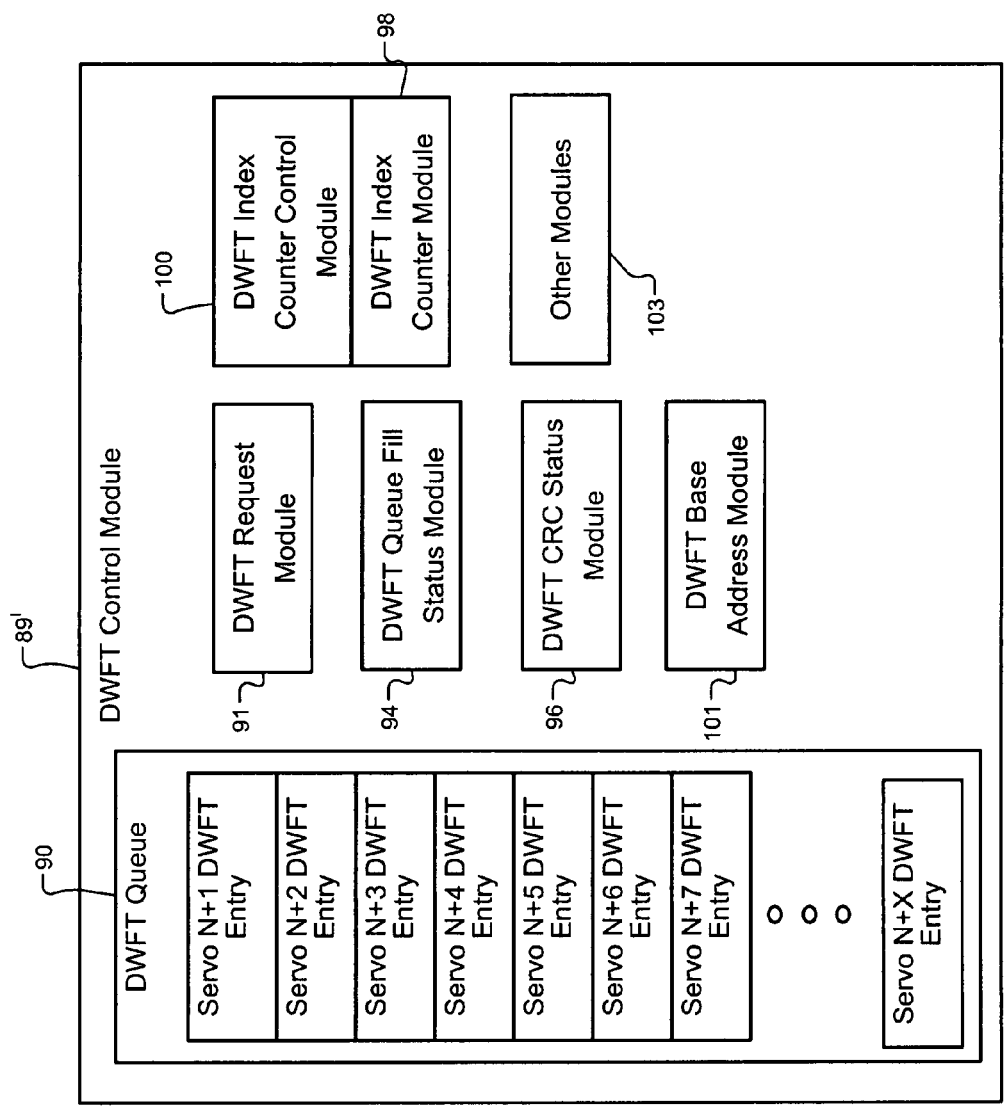
FIG. 3 is a block diagram of a data wedge format table (DWFT) control module in accordance with an embodiment of the present disclosure.

Referring now to FIG. 3, the DWFT control module $89^I$ may include a DWFT request module 91 that may request multiple entries from the DWFT 33 during a single buffer access. The DWFT request module 91 may store the entries in a DWFT queue 90. The DWFT entries may correspond to servo numbers N+1, N+2, . . . , and N+X from the DWFT 33. A DWFT synchronization module 57 of the DF module 23 may synchronize the DWFT entries with servo numbers in the servo counter module 59.

As an illustrative example, for X=8, when the DF module 23 requests a DWFT entry for servo number 10, the buffer controller provides DWFT entries for servo numbers 5 to 13. If the DWFT entry for servo number 10 matches information from the servo counter module 59 for servo number 10, then the DF may determine that the read/write head and servo information in the DF module 23 are synchronized. Otherwise, the DF module 23 determines the DWFT entry that matches the servo number and uses that DWFT entry for formatting or read/write operations.

Referring now to FIGS. 4A and 4B, an exemplary format for a DWFT word 92 within the buffer memory 33 is illustrated. The DWFT word 92 may include bits designated for CRC, reserved operations, first sector ID, number of sectors, words to split, and first sector delay. Further, an exemplary format for a DWFT entry 93 in the DWFT control module queue 90 is illustrated. The DWFT entry 93 may include bits designated for CRC good status, servo number, CRC, reserved operations, first sector ID, number of sectors, words to split, and first sector delay.

A DWFT queue fill status module 94 may monitor the DWFT queue 90 for empty spaces. A DWFT CRC status module 96 may check the CRC of the DWFT entry 93 and the DWFT word 92 before using the DWFT entries. The DWFT CRC status module 96 may signal an error condition based on the CRC status with a CRC good status bit. The DF module 23 may interrupt read/write operations and signal an error condition based on the CRC status.

The DWFT control module $89^I$ counts servo numbers in a DWFT index counter module 98 starting with a base servo number that may be stored in a DWFT base address module 101. The DF module 23 may provide the base servo number. The DWFT control module $89^I$ includes the index counter servo number in the DWFT entry 93 of FIG. 4B. Further, an index counter control module 100 may "or" the output of the DWFT index counter module 98 and a DWFT base address to generate an address of the buffer DWFT word 92 in the buffer memory.

The index counter control module 100 may increment the DWFT index counter module 98 by one after fetching a DWFT entry from the buffer memory. The index counter control module 100 may reset the index counter module 98 to zero if the index counter module 98 reaches a maximum servo number. The DWFT control module $89^I$ may also include other modules 103.

The DF module 23 may discard the DWFT entry for servo N+1 and read the next DWFT entry (for N+2) if the DWFT control module $89^I$ delivers the DWFT entry too late to be used for a first synchronization attempt.

In FIG. 2, the buffer control logic 80 may control the functionality of the buffer control module 76. The ATA bus interface data FIFO 82 buffers data between the ATA bus interface 74 and the buffer memory $32^I$. The CH0 module 84 and the ECC module 86 are part of a read/write channel, which may be referred to as a CH0. The read/write channel facilitates data transfer between the buffer memory $32^I$ and the rotating storage medium. The CH0 module 84 communicates with the buffer memory $32^I$. The ECC module 86 generates ECC bits, which are combined with received data prior to writing to the rotating storage medium. The ECC bits may be encoded prior to being written to a rotating storage medium and may be decoded upon being read from the rotating storage medium for error detection and correction purposes. The read/write channel data FIFOs 88 buffer data between the buffer memory $32^I$ and the DF module 23 and may be part of the CH0 module 84 and/or the ECC module 86.

Any of the control modules $23^I$, 62, 76, 84, 86 of the HDD control module $12^I$ may receive physical sector identification addresses and convert them to logical block addresses (LBAs). The LBAs may be converted to sector numbers and track numbers that may be stored.

Figure 5:
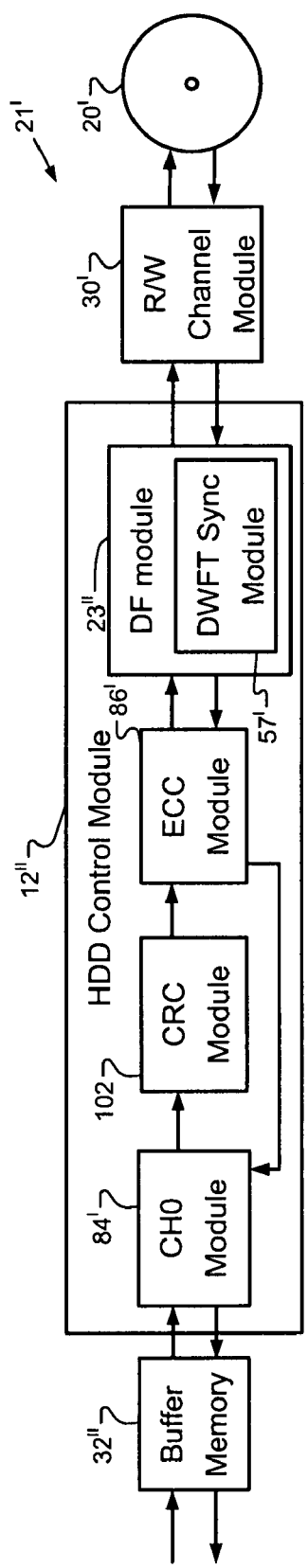
FIG. 5 is a block diagram of a read/write channel in accordance with an embodiment of the present disclosure.

Referring now to FIG. 5, a block diagram of a read/write channel $21^I$ is shown. The read/write channel $21^I$ includes a HDD control module $12^I$ that processes sector data to and from a rotating storage medium $20^I$ via a read/write channel module $30^I$. The HDD control module $31^{II}$ includes a CH0 module $84^I$ that communicates sector data to and from a buffer memory $32^{II}$. A CRC module 102 performs a CRC check on data received from the CH0 module $84^I$ prior to passage to an ECC module $86^I$. The ECC module $86^I$ adds or removes error correction coding bits to the CRC checked data or from formatted data received from the DF module $23^I$. The DF module $23^I$ formats error correction coded data from the ECC module and formats data received from a rotating storage medium $20^I$ based on information within a sector request queue. A read/write channel module is coupled between the DF module $23^I$ and a rotating storage medium $20^I$.

Figure 6:
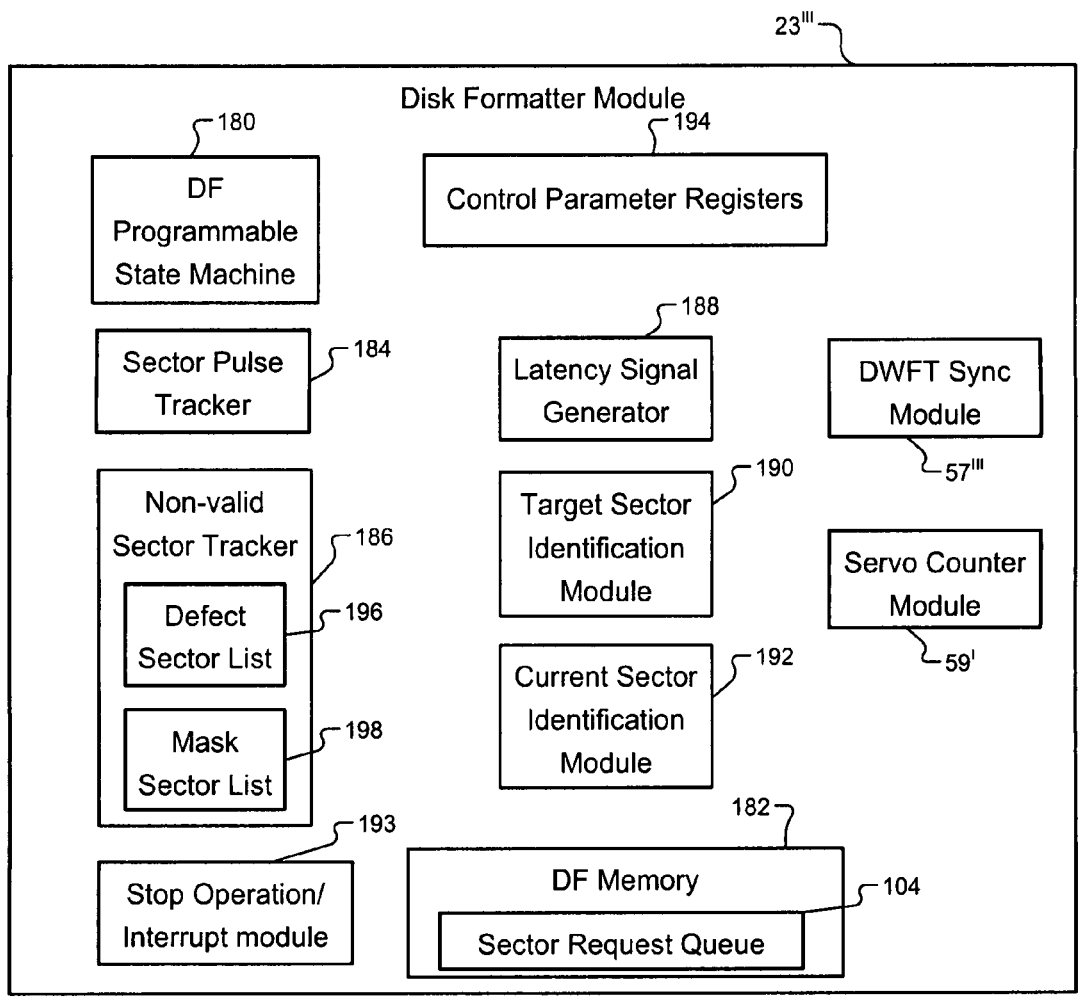
FIG. 6 is a block diagram of a disk formatter in accordance with an embodiment of the present.

Referring to FIG. 6, a block diagram of a DF module $23^{III}$ is shown. The DF module $23^{III}$ includes a DWFT synchronization module $57^I$, a servo counter module $59^I$, a DF programmable control module or state machine 180 and a sector request queue $104^I$. The DF state machine 180, in general, controls the operation of the DF module $23^{III}$. The sector request queue $104^I$ includes various read/write channel information and may be stored in DF memory 182. The DF module $23^{III}$ may also include a sector pulse tracker 184, a non-valid or defective sector tracker 186, a latency signal generator 188, and a target sector identification module (TSIM) 190. The DF module $23^{III}$ may also include a DWFT synchronization module $57^{II}$, a current sector identification module (CSIM) 192, a stop operation/interrupt generation module 193, and various control parameter registers 194. The control parameter registers 194 may be responsive to any or all of the aforementioned modules.

The sector pulse tracker 184 detects sector pulses, which aid in identifying a current sector. When a read/write head passes over the beginning of a sector, that sector has an associated identification pulse that is generated and detected by the sector pulse tracker 184. The sector pulse tracker 184 may be used in tracking sector pulses for identification and detection of a target sector.

The non-valid sector tracker 186 includes a defective sector list 196 and/or a masked list 198. The defective sector list 196 includes identification addresses, sector numbers and/or track numbers of defective sectors. The masked sector list 198 includes identification addresses, sector numbers and/or track numbers of sectors that have been masked. A valid sector is a sector that is not defective or masked. A sector may be masked when it is defective, contains an error, or for some other reason. When a sector is masked, it may be skipped or ignored, such that it is not involved in a read/write operation. The sector pulse tracker 184 and the non-valid sector tracker 186 may be stored in and/or have associated memory.

The latency signal generator 188 generates a latency signal. The latency signal is associated with the lead time or preparation time to perform a read/write operation to a rotating storage medium. The extent of the preparation time is referred to as the preparation period. The preparation period may include calculation time, register load time, data transfer time, etc. The preparation period may include time to determine a current sector, time to load of control parameter information into registers, and time to load data into a buffer.

When in the read/write ready mode the DF module $23^{III}$ is ready to read from or write to a rotating storage medium upon detection of a target start sector and/or a command start sector. A target start sector may be a first sector in a block of target sectors on which to perform a read/write operation, relative to the corresponding track. A command start sector refers to a sector within a block of target sectors on which to start a read/write operation. The command start sector may be any non-defective/non-masked sector in a track including the target start sector.

The TSIM 190 determines the block of target sectors to perform a read/write operation. The TSIM 190 may receive command signals, such as from a HDD control module, a host system control module, or elsewhere. Based on the signals, the TSIM 190 may determine a set of desired sectors on which to perform the read/write operation. The TSIM 190 may convert LBAs into sector and track numbers. The TSIM 190 may determine the appropriate target sectors based on information in the defective sector list and the masked sector list.

The CSIM 192 determines the current sector over which a read/write head is positioned. The CSIM 192 may determine the current sector based on information received from the sector pulse tracker.

The control parameter registers 194 may include a target start LBA register, a target end LBA register, a target sector block register, a target start sector register, a target end sector register, and a buffer sector size register. The registers 194 may also include a buffer memory address pointer register, a clock per sector register, a command latency register, and other registers. The control parameter registers 194 may also include skip sector registers associated with defective sectors or masked sectors, such as that in the defective list 196 and the masked list 198.

As discussed previously, the synchronization module $57^I$ may synchronize respective servo numbers between a DWFT entry and the servo counter module $59^I$. The synchronization module $57^I$ may also initialize the buffer control module 76 with a DWFT base address, a maximum servo number, and a next servo number count, which may be set to N+1.

Figure 7:
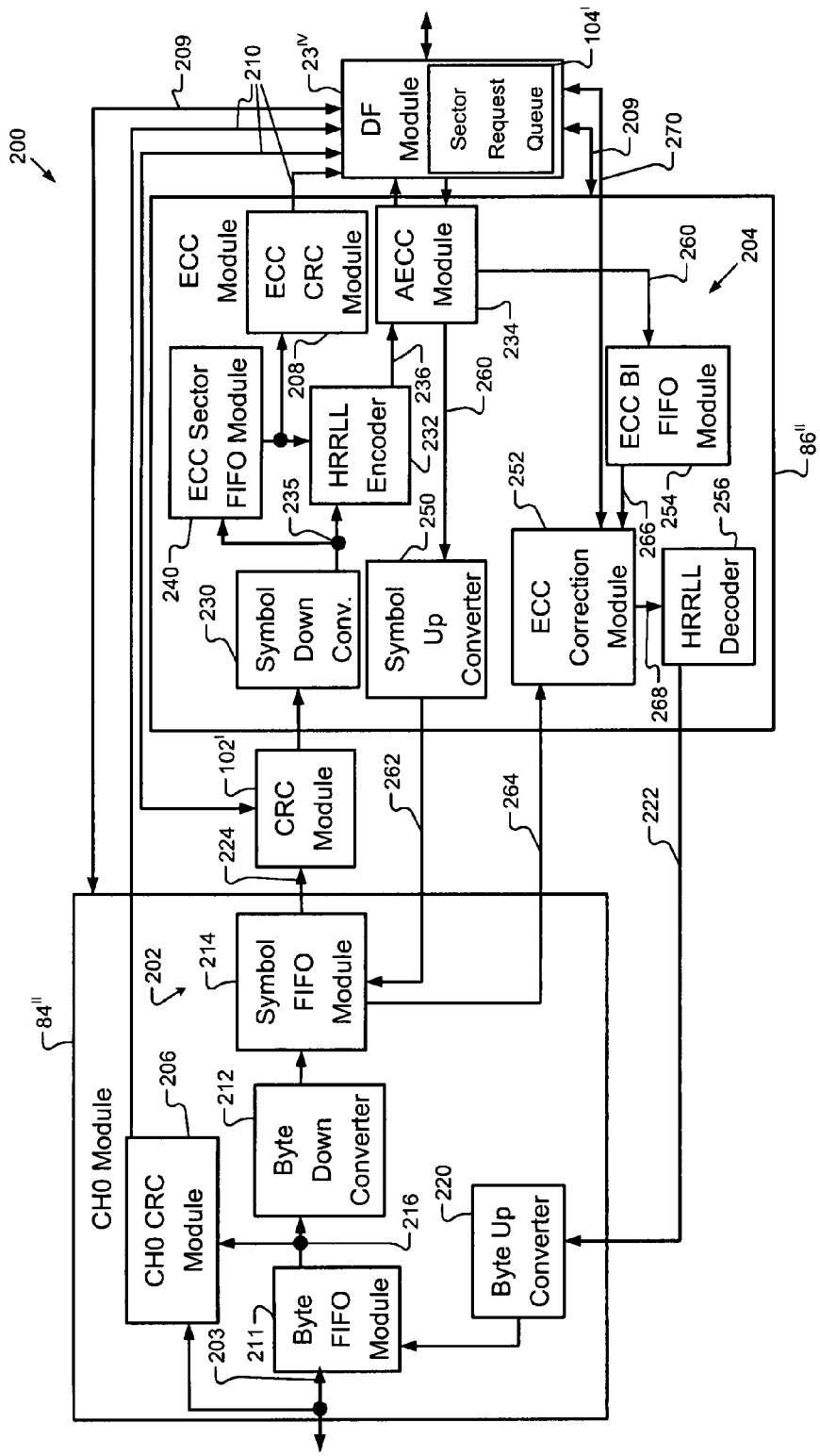
FIG. 7 disclosure is a block diagram of a read/write channel portion of a HDD control module in accordance with an embodiment of the present disclosure.

Referring now to FIG. 7, a block diagram of a read/write channel portion 200 of a HDD control module 12 is shown. The read/write channel portion 200 includes a CH0 module $84^{II}$, an ECC module $86^{II}$ and a DF module $23^{III}$. The read/write channel portion 200 includes a write path 202 for reception of input data 203 and a read path 204 for transmission of output data 205. The read/write channel portion 200 also includes multiple CRC modules, namely a CH0 CRC module 206, a stand alone CRC module $102^I$ and an ECC CRC module 208, which perform checks along the write path 202. The sector request queue $104^I$ may store information received from each of the read/write channel modules $84^{II}$, $86^{II}$ and $23^{III}$, as well as from each of the CRC modules 206, 208, $102^I$.

Read/write channel module communication lines 209 are shown for communication between the read/write channel modules $84^{II}$, $86^{II}$ and the DF module $23^{III}$. CRC communication lines 210 are shown for communication between the CRC modules 206, 208, $102^I$ and the DF module $23^{III}$. This provides a monitor of sector data, correction when appropriate, and an indication of when to pause or stop data transfer at various locations along the write path 202.

The CH0 module $84^{II}$ includes a byte FIFO module 211, a byte down converter 212 and a symbol FIFO module 214. The input data 203 is received and stored in the byte FIFO 211, down converted and then stored in the symbol FIFO 214.

The CH0 module $84^{II}$ also includes the CH0 CRC module 206, which performs any number of CRCs. As shown, the CH0 CRC module 206 performs a first CRC on the received data 203 and a second CRC on byte stored data 216 that is being transferred from the byte FIFO 211 to the byte down converter 212. The CH0 module $84^{II}$ further includes a byte up converter 220, which up converts run length limited (RLL) decoded data 222 from the ECC module $86^{II}$ prior to being stored in the byte FIFO 211. The up conversion is similar to and opposite that of the byte down conversion.

The CRC module $102^I$ is coupled between the CH0 module $84^{II}$ and the ECC module $86^{II}$. The CRC module $102^I$ performs a CRC on symbol stored data 224 from the symbol FIFO 214.

The ECC module $86^{II}$ includes a symbol down converter 230, a high rate RLL (HRRLL) encoder 232 and an advanced error correction code (AECC) module 234. The symbol down converter 230 converts words received from the CRC module $102^I$ to symbols, such as 10-bit symbols. The HRRLL encoder 232 receives and encodes down converted symbols 235 from the down converter 230. The HRRLL encoder 232 prevents long stretches of no transitions, and therefore decoding uncertainty. The HRRLL encoder 232 limits the amount of continuous repeated and uninterrupted 0s and 1s.

The AECC module 234 performs high rate encoding on a data portion and low rate encoding on a Reed-Solomon or parity bit portion of encoded symbols 236 received from the HRRLL encoder 232. The AECC module 234 encodes data before being written to a rotating storage medium, which provides improved recovery of ECC encoded bits. The AECC 234 may also perform permutated error correction coding.

The ECC module $86^{II}$ further includes an ECC sector FIFO module 240 that also receives the down converted symbols 235. The stored symbols may be provided to the HRRLL encoder 232 and to the ECC CRC module 208.

The ECC module $86^{II}$ also includes a symbol up converter 250, an ECC correction module 252, an ECC bus interface (BI) FIFO module 254 and a HRRLL decoder 256. The symbol up converter 250 receives and up converts AECC decoded data 260 from the rotating storage medium to generate up converted data 262. The up converted data 262 is sent to the symbol FIFO 214, which outputs up converted and stored data 264. The AECC decoded data 260 is also passed to and stored in the ECC BI FIFO 254, which outputs decoded and stored data 266. The ECC correction module 252 receives and compares the up converted and stored data 264 with the decoded and stored data 266 and corrects bit errors to generate a corrected data signal 268. The ECC correction module 252 may be in communication with the DF module $23^{II}$ via a correction signal line 270. The HRRLL decoder 256 decodes the corrected data signal, which is sent to the byte up converter 220.

The DF module $23^{III}$, for the embodiment shown, manages and controls operation of the read/write channel portion 200. The DF module $23^{III}$ provides a centralized location for the management of sectors as they advance through different pipeline stages of a read/write channel. The DF module $23^{III}$ monitors and controls the transfer of data between each of the modules $84^{II}$, $102^I$, $86^{II}$. The DF module $23^{II}$ also monitors the state of the data and of the modules $84^{II}$, $102^I$, $86^{II}$. Although the DF module $23^{II}$ is shown and described as having logic to perform the stated control and management, other modules, such as the modules $84^{II}$, $102^I$, $86^{II}$, in a read/write channel or elsewhere may have similar logic.

Figure 8:
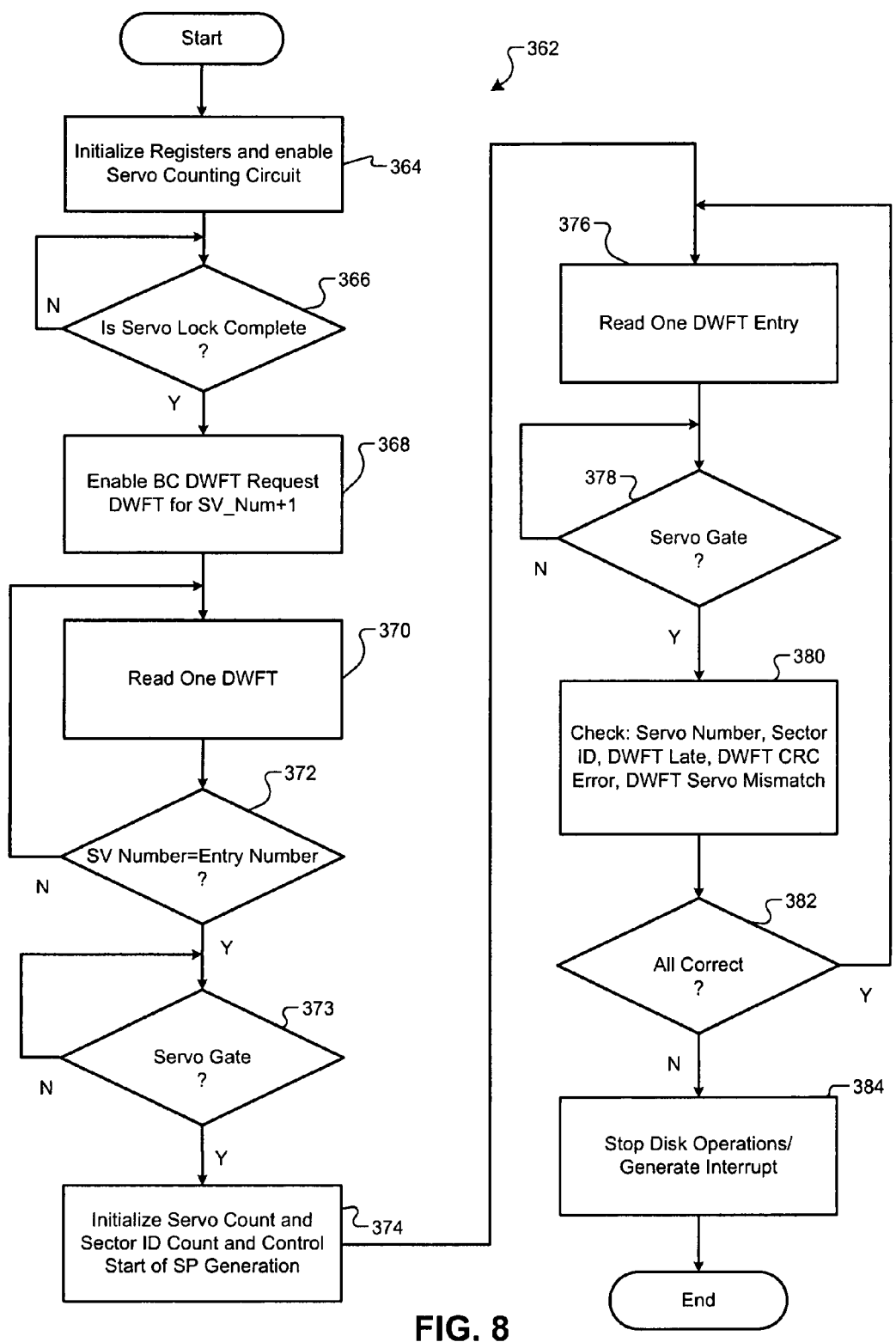
FIG. 8 is a block diagram illustrating a method of managing sector data transfer over a read/write channel in accordance with an embodiment of the present disclosure.

Referring to FIG. 8, a block diagram 362 illustrates a method for synchronizing DWFT with a position of a read/write head. Control starts in step 364 when the HDD control module initializes DF control parameter registers and enables a DWFT servo index counter module. In step 366, the DF determines that the read/write head is finished locking to a particular wedge based on a "Servo Lock Done" signal from the HDD control module. The DF may store the servo number (N) for a sector in the servo counter module at the start of a new servo lock.

In step 368, a DWFT queue fill status module of the DWFT control module may maintain a full DWFT queue by reading DWFT entries from the memory buffer DWFT whenever the DWFT queue has empty spaces. The entries may include DWFT entries for the servo number of the sector that the read/write should be over and other consecutively numbered sectors. In step 370, the DWFT synch module reads a DWFT entry from the queue. In step 372, the DWFT synch module determines whether the servo number of the servo counter module matches the servo number of the DWFT entry. If not, the DWFT synch module checks another DWFT entry against the servo number until a match is found.

In step 373, when the HDD control module generates a servo gate signal, the DF module may initialize synchronization operations in step 374. In other words, the DF may initialize the servo count of the servo counter module and the index counter module. The DF may also initialize the TSIM and CSIM and may further control timing of a sector pulse. In step 376, the DF reads a next DWFT entry.

When the HDD control module generates another servo gate in step 378, the DF may check the validity of the DWFT entry in step 380. The validity check may include checking the servo number, CRC, sector ID, whether the DWFT is late, and DWFT servo mismatch.

The DF may recheck or re-compare the servo number in the servo counter to a servo number extracted from a position of the read/write head. The DF may check the status of the CRC before using the DWFT entry. The DF checks the CRC status when a servo gate ends for one servo wedge and the DWFT entry for the next servo is available. The DF may also recheck the sector ID. The DF compares the First Sector ID supplied by the DWFT entry against the Sector ID counter after generating the first sector pulse on the wedge to determine that they match. The DF also may check that the DWFT control module delivers the DWFT entry before the end of the servo gate, i.e. that there is an entry in the DWFT queue, and the entry is not delivered late. The DF may check that a servo number in the index counter module and the servo number counter module match. The DF can read the DWFT entry for the next servo after generating the first sector pulse on the wedge. The DF may continuously monitor the Servo Lock Done signal. The DF may stop the servo counting and the sector pulse generation when the Servo Lock Done is not asserted.

In step 382, if step 380 checks are all positive, the servo index counter module and the current sector ID module have the correct values, and control resumes in step 376. If there is no error, the DF may use the DWFT entry for the servo counting and the sector pulse generation. The DF may load a First Sector Delay to the sector pulse generation counter to generate the first sector pulse on the wedge. Otherwise, the DF halts read/write operations and generates an interrupt in step 384.

The above-described steps are meant to be illustrative examples; the steps may be performed sequentially, synchronously, simultaneously, or in a different order depending upon the application. These processes may also be performed automatically to simplify DF operations.

Although HDDs are primarily shown and described herein, the embodiments disclosed below may apply to other rotating data storage devices, such as a compact disc (CD) drive, a digital versatile disc (DVD) drive or a high definition/high data storage disc drive.

Figure 9:
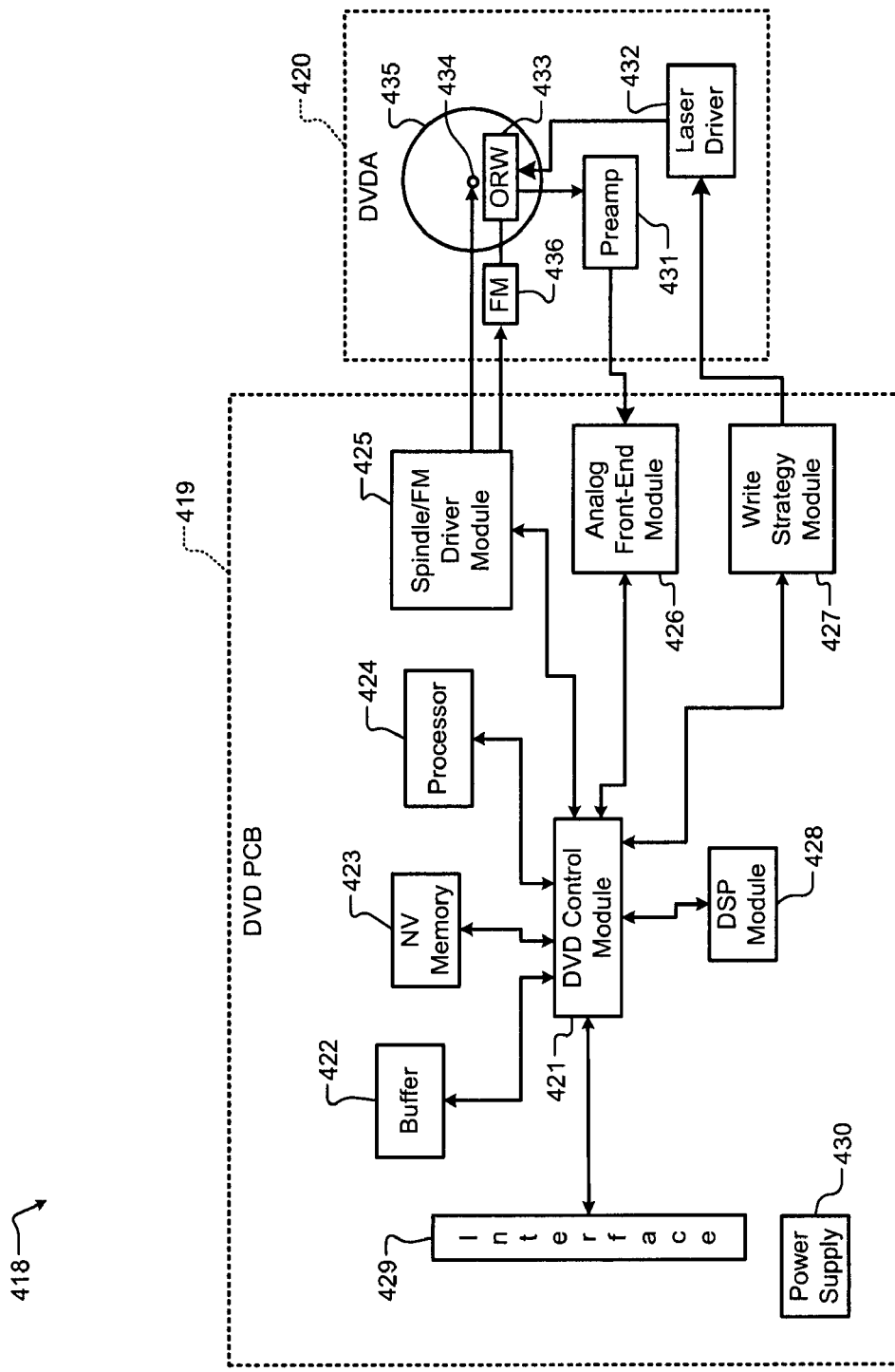
FIG. 9 is a functional block diagram of a DVD drive in accordance with an embodiment of the present disclosure.

Referring now to FIG. 9, a functional block diagram of a DVD drive is shown. The teachings of the disclosure can be implemented in a DVD control module 421 of a DVD drive 418 or of a CD drive (not shown) or other optical drive. The DVD control module 421 may include and perform synchronization of servo numbers in a disk formatter module and a DWFT as above described. The DVD drive 418 includes a DVD PCB 419 and a DVD assembly (DVDA) 420. The DVD PCB 419 includes a DVD control module 421, a buffer 422, nonvolatile memory 423, a processor 424, a spindle/FM (feed motor) driver module 425, an analog front-end module 426, a write strategy module 427, and a DSP module 428.

The DVD control module 421 controls components of the DVDA 420 and communicates with an external device (not shown) via an I/O interface 429. The external device may include a computer, a multimedia device, a mobile computing device, etc. The I/O interface 429 may include wireline and/or wireless communication links.

The DVD control module 421 may receive data from the buffer 422, nonvolatile memory 423, the processor 424, the spindle/FM driver module 425, the analog front-end module 426, the write strategy module 427, the DSP module 428, and/or the I/O interface 429. The processor 424 may process the data, including encoding, decoding, filtering, and/or formatting. The DSP module 428 performs signal processing, such as video and/or audio coding/decoding. The processed data may be output to the buffer 422, nonvolatile memory 423, the processor 424, the spindle/FM driver module 425, the analog front-end module 426, the write strategy module 427, the DSP module 428, and/or the I/O interface 429.

The DVD control module 421 may use the buffer 422 and/or nonvolatile memory 423 to store data related to the control and operation of the DVD drive 418. The buffer 422 may include DRAM, SDRAM, etc. The nonvolatile memory 423 may include flash memory (including NAND and NOR flash memory), phase change memory, magnetic RAM, or multi-state memory, in which each memory cell has more than two states. The DVD PCB 419 includes a power supply 430 that provides power to the components of the DVD drive 418.

The DVDA 420 may include a preamplifier device 431, a laser driver 432, and an optical device 433, which may be an optical read/write (ORW) device or an optical read-only (OR) device. A spindle motor 434 rotates an optical storage medium 435, and a feed motor 436 actuates the optical device 433 relative to the optical storage medium 435.

When reading data from the optical storage medium 435, the laser driver provides a read power to the optical device 433. The optical device 433 detects data from the optical storage medium 435, and transmits the data to the preamplifier device 431. The analog front-end module 426 receives data from the preamplifier device 431 and performs such functions as filtering and A/D conversion. To write to the optical storage medium 435, the write strategy module 427 transmits power level and timing data to the laser driver 432. The laser driver 432 controls the optical device 433 to write data to the optical storage medium 435.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control module for a rotating storage medium, comprising:
    a data wedge format table (DWFT);
    a buffer control module that comprises a DWFT queue that includes X entries from said DWFT and one of X first servo information for each of said X entries, where X is a positive integer; and
    a disk formatter module that compares said one of X first servo information with second servo information that is based on a current position of a read/write device in relation to the rotating storage medium.

2. The control module of claim 1 wherein said first servo information comprises sequential servo numbers, where one of said servo numbers corresponds to said current position.

3. The control module of claim 2 wherein said disk formatter module selects one of said X entries having said one of said servo numbers.

4. The control module of claim 1 further comprising buffer memory that stores said DWFT, wherein said buffer control module fills multiple entries in said DWFT queue during a single access to said buffer memory.

5. The control module of claim 1 wherein said buffer control module further comprises a fill status module that determines whether said DWFT queue is full.

6. The control module of claim 5 wherein said buffer control module further comprises a request module that requests entries from said DWFT based on signals from said fill status module.

7. The control module of claim 1 wherein said buffer control module further comprises a DWFT control module that comprises:
said DWFT queue;
an index counter; and
an index counter controller that increments said index counter and associates said first servo information for each of said X entries.

8. The control module of claim 7 wherein said DWFT control module further comprises a cyclical redundancy check (CRC) status module that checks said X entries with said DWFT.

9. The control module of claim 1 wherein said disk formatter module comprises a servo counter module that includes said second servo information, wherein said second servo information comprises servo numbers.

10. The control module of claim 1 wherein said disk formatter module checks entries of said DWFT queue prior to comparing said first and second servo information.

11. A disk formatter module for a rotating storage medium, comprising:
a servo counter module that counts first servo information that is based on a current position of a read/write head over the rotating storage medium; and
a DWFT synchronization module that compares said first servo information with second servo information from a data wedge format table (DWFT) queue that includes X entries from a DWFT, where X is a positive integer.

12. The disk formatter module of claim 11 wherein one of said X entries is used for at least one of read and write operations to the rotating storage medium based on said comparison.

13. The disk formatter module of claim 11 wherein said first servo information comprises sequential servo numbers, where one of said servo numbers corresponds to said current position.

14. The disk formatter module of claim 11 further comprising a sector pulse tracker that determines a start of a sector pulse for the rotating storage medium.

15. The disk formatter module of claim 11 further comprising a stop operation/interrupt module that halts an operation of the disk formatter module and generates an interrupt based on a mismatch between one of said X entries and said current position following said comparison.

16. A hard disk drive system comprising:
the disk formatter module of claim 11;
buffer memory that comprises said DWFT; and
a buffer control module that comprises said DWFT queue and that controls said buffer memory.

17. The hard disk drive system of claim 16 wherein said buffer control module further comprises a fill status module that determines a number of entries in said DWFT queue.

18. The hard disk drive system of claim 17 wherein said buffer control module further comprises a request module that requests entries from said DWFT based on fill status module signals.

19. The hard disk drive system of claim 16 wherein said buffer control module further comprises a DWFT control module that comprises:
said DWFT queue;
an index counter; and
an index counter controller that increments said index counter for each DWFT entry in said DWFT queue.

20. The hard disk drive system of claim 19 wherein said DWFT control module further comprises a cyclical redundancy check (CRC) status module that checks said X entries with said DWFT.

21. The disk formatter module of claim 11 wherein said DWFT synchronization module checks entries of said DWFT queue prior to comparing said first and second servo information.

22. A method for controlling a rotating storage medium, comprising:
controlling a data wedge format table (DWFT) queue that includes X entries from a DWFT and one of X first servo information for each of said X entries, where X is a positive integer; and
comparing said one of X first servo information with second servo information that is based on a current position of a read/write device in relation to the rotating storage medium.

23. The method of claim 22 wherein said first servo information comprises sequential servo numbers, where one of said servo numbers corresponds to said current position.

24. The method of claim 23 further comprising selecting one of said X entries having said one of said servo numbers.

25. The method of claim 22 further comprising:
storing said DWFT in a buffer memory; and
filling multiple entries in said DWFT queue during a single access to said buffer memory.

26. The method of claim 22 further comprising determining whether said DWFT queue is full.

27. The method of claim 26 further comprising requesting entries from said DWFT based on whether said DWFT queue is full.

28. The method of claim 22 wherein said second servo information comprises servo numbers.

29. The method of claim 22 further comprising checking entries of said DWFT queue prior to comparing said first and second servo information.

30. A method for operating a disk formatter module for a rotating storage medium, comprising:
counting first servo information that is based on a current position of a read/write head over the rotating storage medium; and
comparing said first servo information with second servo information from a data wedge format table (DWFT) queue that includes X entries from a DWFT, where X is a positive integer.

31. The method of claim 30 further comprising using one of said X entries for at least one of read and write operations to the rotating storage medium based on said comparison.

32. The method of claim 30 wherein said first servo information comprises sequential servo numbers, where one of said servo numbers corresponds to said current position.

33. The method of claim 30 further comprising determining a start of a sector pulse for the rotating storage medium.

34. The method of claim 30 further comprising:
halting an operation of the disk formatter module; and generating an interrupt based on a mismatch between one of said X entries and said current position following said comparison.

35. The method of claim 30 further comprising determining a number of entries in said DWFT queue.

36. The method of claim 35 further comprising requesting entries from said DWFT based on said number of entries in said DWFT queue.

37. The method of claim 36 further comprising checking said X entries with said DWFT.

38. The method of claim 30 further comprising checking entries of said DWFT queue prior to comparing said first and second servo information.

39. A control module for a rotating storage medium, comprising:
- a data wedge format table (DWFT);
- buffer control means for controlling buffer means for storing data that comprises a DWFT queue that includes X entries from said DWFT and one of X first servo information for each of said X entries, where X is a positive integer; and
- disk formatter means for comparing said one of X first servo information with second servo information that is based on a current position of a read/write device in relation to the rotating storage medium.

40. The control module of claim 39 wherein said first servo information comprises sequential servo numbers, where one of said servo numbers corresponds to said current position.

41. The control module of claim 40 wherein said disk formatter means selects one of said X entries having said one of said servo numbers.

42. The control module of claim 39 further comprising said buffer means that stores said DWFT, wherein said buffer control means fills multiple entries in said DWFT queue during a single access to said buffer means.

43. The control module of claim 39 wherein said buffer control means further comprises fill status means for determining whether said DWFT queue is full.

44. The control module of claim 43 wherein said buffer control means further comprises request means for requesting entries from said DWFT based on signals from said fill status means.

45. The control module of claim 39 wherein said buffer control means further comprises DWFT control means for controlling that comprises:
- said DWFT queue;
- index counter means for counting; and
- index counter control means for incrementing said index counter means and for associating said first servo information for each of said X entries.

46. The control module of claim 45 wherein said DWFT control means further comprises cyclical redundancy check (CRC) status means for checking said X entries with said DWFT.

47. The control module of claim 39 wherein said disk formatter means comprises servo counter means for counting that includes said second servo information, wherein said second servo information comprises servo numbers.

48. The control module of claim 39 wherein said disk formatter means checks entries of said DWFT queue prior to comparing said first and second servo information.

49. A disk formatter module for a rotating storage medium, comprising:
- servo counter means for counting first servo information that is based on a current position of a read/write head over the rotating storage medium; and
- DWFT synchronization means for comparing said first servo information with second servo information from a data wedge format table (DWFT) queue that includes X entries from a DWFT, where X is a positive integer.

50. The disk formatter module of claim 49 wherein one of said X entries is used for at least one of read and write operations to the rotating storage medium based on said comparison.

51. The disk formatter module of claim 49 wherein said first servo information comprises sequential servo numbers, where one of said servo numbers corresponds to said current position.

52. The disk formatter module of claim 49 further comprising sector pulse tracker means for determining a start of a sector pulse for the rotating storage medium.

53. The disk formatter module of claim 49 further comprising stop operation/interrupt means for halting an operation of the disk formatter module and for generating an interrupt based on a mismatch between one of said X entries and said current position following said comparison.

54. A hard disk drive system comprising:
- the disk formatter module of claim 49;
- buffer means for storing said DWFT; and
- buffer control means for controlling said buffer.

55. The hard disk drive system of claim 54 wherein said buffer control means further comprises fill status means for determining a number of entries in said DWFT queue.

56. The hard disk drive system of claim 55 wherein said buffer control means further comprises request means for requesting entries from said DWFT based on fill status means signals.

57. The hard disk drive system of claim 54 wherein said buffer control means further comprises DWFT control means for controlling said DWFT that comprises:
- said DWFT queue;
- index counter means for counting; and
- index counter control means for incrementing said index counter means for each DWFT entry in said DWFT queue.

58. The hard disk drive system of claim 57 wherein said DWFT control means further comprises cyclical redundancy check (CRC) status means for checking said X entries with said DWFT.

59. The disk formatter module of claim 49 wherein said DWFT synchronization means checks entries of said DWFT queue prior to comparing said first and second servo information.

* * * * *